(12) United States Patent
Thomas et al.

(10) Patent No.: US 11,711,459 B2
(45) Date of Patent: Jul. 25, 2023

(54) ADAPTABLE COMMUNICATION TECHNIQUES FOR ELECTRONIC DEVICES

(71) Applicant: IpVenture, Inc., San Jose, CA (US)

(72) Inventors: C. Douglass Thomas, Saratoga, CA (US); Peter P. Tong, Mountain View, CA (US)

(73) Assignee: IpVenture, Inc., San Jose, CA (US)

( * ) Notice: Subject to any disclaimer, the term of this patent is extended or adjusted under 35 U.S.C. 154(b) by 0 days.

(21) Appl. No.: 16/446,710

(22) Filed: Jun. 20, 2019

(65) Prior Publication Data

US 2019/0306305 A1   Oct. 3, 2019

Related U.S. Application Data

(60) Continuation of application No. 14/286,976, filed on May 23, 2014, which is a continuation of application No. 13/593,483, filed on Aug. 23, 2012, now Pat. No. 8,737,978, which is a continuation of application No. 13/363,360, filed on Jan. 31, 2012, now Pat. No. 8,280,419, which is a continuation of application No. 12/987,018, filed on Jan. 7, 2011, now Pat. No.
(Continued)

(51) Int. Cl.
| | |
|---|---|
| *H04W 4/16* | (2009.01) |
| *H04M 1/72484* | (2021.01) |
| *H04M 3/436* | (2006.01) |
| *H04M 1/72436* | (2021.01) |

(52) U.S. Cl.
CPC ... *H04M 1/72484* (2021.01); *H04M 1/72436* (2021.01); *H04M 3/436* (2013.01); *H04W 4/16* (2013.01); *H04M 2201/60* (2013.01); *H04M 2203/2011* (2013.01); *H04M 2203/651* (2013.01); *H04M 2207/18* (2013.01)

(58) Field of Classification Search
CPC ......... H04M 1/72552; H04M 1/72597; H04M 2201/60; H04M 2203/2011; H04M 2203/651; H04M 2207/18; H04M 3/436; H04W 4/16
See application file for complete search history.

(56) References Cited

U.S. PATENT DOCUMENTS

| | | |
|---|---|---|
| 5,276,731 A | 1/1994 | Arbel et al. |
| 5,425,516 A | 6/1995 | Daines |
| | (Continued) | |

FOREIGN PATENT DOCUMENTS

| | | |
|---|---|---|
| CN | 1453981 | 11/2003 |
| WO | WO 01/45343 A2 | 6/2001 |

OTHER PUBLICATIONS

Notice of Allowance for U.S. Appl. No. 11/006,343 dated Jun. 6, 2006.
(Continued)

*Primary Examiner* — Lester G Kincaid
*Assistant Examiner* — Dung L Lam

(57) ABSTRACT

Improved approaches for users of electronic devices to communicate with one another are disclosed. The electronic devices have audio and/or textual output capabilities. The improved approaches can enable users to communicate in different ways depending on device configuration, user preferences, prior history, etc. In one embodiment, the communication between users is achieved by short audio or textual messages.

20 Claims, 7 Drawing Sheets

Related U.S. Application Data 8,112,104, which is a continuation of application No. 12/074,961, filed on Mar. 7, 2008, now Pat. No. 7,890,128, which is a continuation of application No. 11/497,651, filed on Aug. 2, 2006, now Pat. No. 7,376,434, which is a division of application No. 11/006,343, filed on Dec. 7, 2004, now Pat. No. 7,116,976.

(60) Provisional application No. 60/527,565, filed on Dec. 8, 2003.

(56) References Cited

U.S. PATENT DOCUMENTS

| | | |
|---|---|---|
| 5,548,636 A | 8/1996 | Bannister et al. |
| 5,610,970 A | 5/1997 | Fuller et al. |
| 5,752,191 A | 5/1998 | Fuller et al. |
| 5,758,079 A | 5/1998 | Ludwig et al. |
| 5,828,731 A | 10/1998 | Szlam et al. |
| 5,930,700 A | 7/1999 | Pepper et al. |
| 5,970,388 A | 10/1999 | Will |
| 6,119,022 A | 9/2000 | Osborn et al. |
| 6,327,628 B1 | 12/2001 | Anuff et al. |
| 6,359,892 B1 | 3/2002 | Szlam |
| 6,463,462 B1 | 10/2002 | Smith et al. |
| 6,577,859 B1 | 6/2003 | Zahavi et al. |
| 6,636,888 B1 | 10/2003 | Bookspan et al. |
| 6,665,534 B1 | 12/2003 | Conklin et al. |
| 6,788,766 B2 | 9/2004 | Logan |
| 6,801,793 B1 | 10/2004 | Aarnio et al. |
| 6,816,578 B1 | 11/2004 | Kredo et al. |
| 6,819,757 B1 | 11/2004 | Cook et al. |
| 6,819,945 B1 | 11/2004 | Chow et al. |
| 6,977,624 B1 | 12/2005 | Szente et al. |
| 6,978,136 B2 | 12/2005 | Jenniges et al. |
| 7,010,288 B2 | 3/2006 | Brown et al. |
| 7,010,332 B1 | 3/2006 | Irvin et al. |
| 7,027,842 B2 | 4/2006 | Zhang et al. |
| 7,043,261 B2 | 5/2006 | Krishnan |
| 7,058,036 B1 | 6/2006 | Yu et al. |
| 7,072,452 B1 | 7/2006 | Roberts et al. |
| 7,085,253 B2 | 8/2006 | Yang |
| 7,107,010 B2 | 9/2006 | Heinonen et al. |
| 7,110,963 B2 | 9/2006 | Negreiro |
| 7,111,044 B2 | 9/2006 | Lee |
| 7,116,976 B2 | 10/2006 | Thomas et al. |
| 7,188,073 B1 | 3/2007 | Tam et al. |
| 7,245,266 B1 | 7/2007 | Szente et al. |
| 7,317,706 B1 | 1/2008 | Hao et al. |
| 7,346,630 B2 | 3/2008 | Eichstaedt et al. |
| 7,376,434 B2 | 5/2008 | Thomas et al. |
| 7,403,972 B1 | 7/2008 | Lau et al. |
| 7,587,039 B1 | 9/2009 | Koch |
| 7,649,877 B2 | 1/2010 | Vieri et al. |
| 7,686,693 B2 | 3/2010 | Danieli et al. |
| 7,729,688 B2 | 6/2010 | Cheung et al. |
| 7,792,552 B2 | 9/2010 | Thomas et al. |
| 7,890,128 B1 | 2/2011 | Thomas et al. |
| 7,904,516 B2 | 3/2011 | Chern |
| 8,014,723 B2 | 9/2011 | Batey, Jr. et al. |
| 8,112,104 B1 | 2/2012 | Thomas et al. |
| 8,280,419 B1 | 10/2012 | Thomas et al. |
| 8,353,773 B2 | 1/2013 | Sasaki et al. |
| 8,391,459 B2 | 3/2013 | Jackson et al. |
| 8,429,231 B2 | 4/2013 | Wu et al. |
| 8,737,978 B1 | 5/2014 | Thomas et al. |
| 8,744,407 B2 | 6/2014 | Cheung et al. |
| 8,827,811 B2 | 9/2014 | Kim et al. |
| 9,204,268 B2 | 12/2015 | Cheung et al. |
| 9,555,334 B2 | 1/2017 | Bernard et al. |
| 9,736,664 B2 | 8/2017 | Cheung et al. |
| 10,142,810 B2 | 11/2018 | Cheung et al. |
| 10,183,219 B2 | 1/2019 | Linden et al. |
| 10,207,191 B2 | 2/2019 | Jensen |
| 10,492,038 B2 | 11/2019 | Cheung et al. |
| 10,708,727 B2 | 7/2020 | Cheung et al. |
| 11,019,199 B2 | 5/2021 | Thomas et al. |
| 2001/0011014 A1 | 8/2001 | Higuchi et al. |
| 2001/0012336 A1 | 8/2001 | Joyce et al. |
| 2001/0014611 A1 | 8/2001 | Dufort |
| 2001/0028709 A1* | 10/2001 | Makela .............. H04M 1/72547 379/214.01 |
| 2001/0031633 A1 | 10/2001 | Tuomela et al. |
| 2001/0032234 A1* | 10/2001 | Summers ............ H04M 3/4938 709/201 |
| 2002/0067806 A1 | 6/2002 | Rodriguez et al. |
| 2002/0073207 A1 | 6/2002 | Widger et al. |
| 2002/0094067 A1 | 7/2002 | August |
| 2002/0102969 A1 | 8/2002 | Enns et al. |
| 2002/0142756 A1 | 10/2002 | Rutledge et al. |
| 2002/0181671 A1* | 12/2002 | Logan ................. H04M 1/6505 379/67.1 |
| 2002/0181672 A1 | 12/2002 | Cannell et al. |
| 2003/0028380 A1 | 2/2003 | Freeland et al. |
| 2003/0039339 A1 | 2/2003 | Luehrig et al. |
| 2003/0041048 A1 | 2/2003 | Balasuriya |
| 2003/0062998 A1 | 4/2003 | Rubenstein |
| 2003/0064716 A1 | 4/2003 | Gailey et al. |
| 2003/0065779 A1 | 4/2003 | Malik |
| 2003/0103600 A1 | 6/2003 | Potter |
| 2003/0105854 A1 | 6/2003 | Thorsteinsson et al. |
| 2003/0112948 A1 | 6/2003 | Brown et al. |
| 2003/0129968 A1 | 7/2003 | Earl |
| 2003/0191676 A1 | 10/2003 | Templeton |
| 2003/0191814 A1 | 10/2003 | Tran |
| 2003/0232629 A1 | 12/2003 | Jang et al. |
| 2004/0024882 A1 | 2/2004 | Austin et al. |
| 2004/0047339 A1 | 3/2004 | Wang et al. |
| 2004/0072585 A1 | 4/2004 | Le et al. |
| 2004/0078340 A1 | 4/2004 | Evans |
| 2004/0122979 A1 | 6/2004 | Kirkland |
| 2004/0143667 A1 | 7/2004 | Jerome |
| 2004/0203794 A1* | 10/2004 | Brown ................. H04M 1/642 455/445 |
| 2004/0203919 A1 | 10/2004 | Ross et al. |
| 2004/0240650 A1 | 12/2004 | Bear et al. |
| 2004/0248596 A1 | 12/2004 | Panchal |
| 2004/0267887 A1 | 12/2004 | Berger et al. |
| 2005/0013419 A1 | 1/2005 | Pelaez et al. |
| 2005/0020288 A1 | 1/2005 | Davis |
| 2005/0027385 A1 | 2/2005 | Yuch |
| 2005/0037785 A1 | 2/2005 | Chen |
| 2005/0038690 A1 | 2/2005 | Hayes-Roth |
| 2005/0071253 A1 | 3/2005 | Yang |
| 2005/0107130 A1 | 5/2005 | Peterson, II |
| 2005/0130631 A1 | 6/2005 | Maguire et al. |
| 2005/0136955 A1 | 6/2005 | Mumick et al. |
| 2005/0191994 A1 | 9/2005 | May et al. |
| 2005/0192061 A1 | 9/2005 | May et al. |
| 2005/0273327 A1 | 12/2005 | Krishnan |
| 2006/0003803 A1 | 1/2006 | Thomas et al. |
| 2006/0031303 A1* | 2/2006 | Pang ................... G06Q 10/107 709/206 |
| 2006/0075038 A1 | 4/2006 | Mason et al. |
| 2006/0098650 A1 | 5/2006 | Beninato et al. |
| 2006/0126806 A1 | 6/2006 | Trandal et al. |
| 2006/0168054 A1 | 7/2006 | Burkhart et al. |
| 2006/0212561 A1 | 9/2006 | Feng |
| 2006/0239419 A1 | 10/2006 | Joseph et al. |
| 2006/0259565 A1 | 11/2006 | Cheung et al. |
| 2006/0276210 A1 | 12/2006 | Thomas et al. |
| 2006/0288099 A1 | 12/2006 | Jefferson et al. |
| 2007/0005368 A1 | 1/2007 | Chutorash et al. |
| 2007/0047522 A1 | 3/2007 | Jefferson et al. |
| 2007/0238474 A1 | 10/2007 | Ballas |
| 2007/0293186 A1 | 12/2007 | Lehmann |
| 2008/0261636 A1 | 10/2008 | Lau et al. |
| 2010/0114958 A1 | 5/2010 | Korenshtein |
| 2010/0205272 A1 | 8/2010 | Cheung et al. |
| 2011/0151582 A1 | 6/2011 | Basile |
| 2011/0151852 A1 | 6/2011 | Olincy et al. |
| 2014/0242956 A1 | 8/2014 | Cheung et al. |
| 2014/0256293 A1 | 9/2014 | Thomas et al. |

(56) References Cited

U.S. PATENT DOCUMENTS

| | | |
|---|---|---|
| 2016/0044474 A1 | 2/2016 | Cheung et al. |
| 2017/0201872 A1 | 7/2017 | Cheung et al. |
| 2018/0014169 A1 | 1/2018 | Cheung et al. |
| 2019/0387371 A1 | 12/2019 | Cheung et al. |
| 2020/0186975 A1 | 6/2020 | Cheung et al. |

OTHER PUBLICATIONS

Office Action for U.S. Appl. No. 11/497,651 dated May 14, 2007.
Office Action for U.S. Appl. No. 11/497,651 dated Oct. 9, 2007.
Notice of Allowance for U.S. Appl. No. 11/497,651 dated Nov. 27, 2007.
Office Action for U.S. Appl. No. 12/074,961, dated Feb. 22, 2010.
Office Action for U.S. Appl. No. 12/074,961, dated Aug. 27, 2010.
Notice of Allowance for U.S. Appl. No. 12/074,961, dated Oct. 15, 2010.
Office Action for U.S. Appl. No. 12/987,018, dated Mar. 28, 2011.
Notice of Allowance for U.S. Appl. No. 12/987,018, dated Aug. 22, 2011.
Notice of Allowance for U.S. Appl. No. 12/987,018, dated Nov. 2, 2011.
Notice of Allowance for U.S. Appl. No. 13/363,360, dated Mar. 27, 2012.
Notice of Allowance for U.S. Appl. No. 13/363,360, dated Jul. 9, 2012.
Office Action for U.S. Appl. No. 13/593,483, dated Dec. 7, 2012.
Notice of Allowance for U.S. Appl. No. 13/593,483, dated Sep. 12, 2013.
Notice of Allowance for U.S. Appl. No. 13/593,483, dated Jan. 23, 2014.
Office Action for U.S. Appl. No. 14/286,976, dated Jul. 1, 2014.
Office Action for U.S. Appl. No. 14/286,976, dated Nov. 19, 2014.
Advisory Action for U.S. Appl. No. 14/286,976, dated Apr. 23, 2015.
Office Action for U.S. Appl. No. 14/286,976, dated Jun. 18, 2015.
Office Action for U.S. Appl. No. 14/286,976, dated Apr. 19, 2016.
Office Action for U.S. Appl. No. 14/286,976, dated Dec. 13, 2016.
Office Action for U.S. Appl. No. 14/286,976, dated Aug. 23, 2017.
Office Action for U.S. Appl. No. 14/286,976, dated Apr. 3, 2018.
Office Action for U.S. Appl. No. 14/286,976, dated Jul. 5, 2018.
Office Action for U.S. Appl. No. 14/286,976, dated May 7, 2019.
"Company Overview", http://www.fastmobile.com/company_overview.html, downloaded Nov. 5, 2003, p. 1.
"Introducing the Tellme Voice Application Network", Tellme, http://www.tellme.com/products/, downloaded Oct. 2, 2003, p. 1.
"Iotum History," Iotum Corp., http://iotum.com/simplyrelevant/2006/04/03/iotum-history/, downloaded May 15, 2006, pp. 1-4.
"Messaging", Vodafone Group, 2001, http:www.vodafone.co.nz/business/10.2.3_messaging.jsp, downloaded Oct. 14, 2003, pp. 1-2.
"Microsoft Windows Messenger: Go Beyond Text with Voice & Video Chats", Dell Inc., http://www.dell.com/us/en/dhs/topics/segtopic_002_xp_im.htm, downloaded Oct. 2, 2003, pp. 1-2.
"Microsoft Windows Messenger: Instantly Communicate with Family and Friends Messenger", Dell Inc., http://www.dell.com/us/en/dhs/topics/segtopic_001_xp_im.htm, downloaded Oct. 2, 2003, pp. 1-3.
"Our Solution," Iotum Corp., http://www.iotum.com/our_solution.php, downloaded May 15, 2006, pp. 1-2.
Short Message Service/Interactive Voice Response (SMS/IVR), Lucent Technologies, 2003, pp. 1-2.
"text messaging", Vodafone Group, 2001, Vodafone—Services, "All about text messaging", http://www.vodafone.co.nz/services/07.a.1_two_way_messaging.jsp?hd=4yourbusiness& . . . , downloaded Oct. 14, 2003, pp. 1-2.
"We bring relevance to communications," Cnet News, Ina Fried, Jul. 21, 2005, pp. 1-2.
Appenzeller, et al., "The Mobile People Architecture", Technical Report: CSL-TR-00000, Computer Systems Laboratory, Departments of Electrical Engineering and Computer Science, Stanford University, Jan. 1999, pp. 1-13.
Blackberry, "Voice and SMS", http://www.blackberry.com/products/service/voices_sms.shtml?DCPID=hmsvoice downloaded Oct. 2, 2003, page1.
Bulk, F. "Final Project: Skype," http://www1.cs.columbia.edu/~salman/skype/frank.pdf, May 5, 2004, pp. 23.
Calsyn, Martin and Desseault, Lisa, "Presence Information Protocol Requirements," Internet Draft, Feb. 9, 1998, pp. 1-27.
Emergin Inc., "Emergin WirelessOffice 5.0", http://www.emergin.com/?source=overture, downloaded Oct. 2, 2003, p. 1.
Fastmobile Inc., "Dialog GSM launches Push 'n' Talk walkie talkie service Push to Talk over Cellular Now in Sri Lanka Dialog GSM Pioneers Latest GSM Advancement", Press Release, Dec. 1, 2004, pp. 1-2.
Fastmobile, "fastmobile's fastchat™ Instant Communications Application is Coming to Thousands of Mobile Phone Retail Stores Nationwide", fastmobile Press Release, Sep. 15, 2003, pp. 1-3.
IMBOT, Press Release, "IMBOT offers new Text 2 Voice Service Text 2 Voice service enables wireless customers to send voice messages from 2-Way devices", Oct. 29, 2001, pp. 1-2.
Internet Traveler, "Welcome to the Inter.Net Communicator Tour!", http://www.inter.net/traveler/tour/communicator_messaging.php, downloaded Oct. 14, 2003, p. 1.
J. Rosenberg, H. Schulzrinne, Internet Draft, "SIP For Presence," http://www.alternic.org/drafts/drafts-r-s/draft-rosenberg=sip-pip-00.txt, Nov. 13, 1998, Bell Laboratories, Columbia, pp. 1-31.
Joseph, Anthony D. et al., "The Case for Services over Cascaded Networks", EECS Department, CS Division, University of California, Berkeley, http://iceberg.cs.berkeley.edu/, International Conference on Wireless and Mobile Multimedia 1998, pp. 1-9.
Mobileshop, "SMS—also know as text messaging", http://www.mobileshop.org/howitworks.sms.htm, downloaded Oct. 14, 2003, pp. 1-2.
Schulzrinne, H. et al., RPID: Rich Presence Extensions to the Presence Information Data Format (PIDF), draft-ietf=simple-rpid-06.txt, Jun. 2, 2005, http://www1.ietf.org/mail-archive/web/simple/current/msg05398.html, downloaded Nov. 15, 2006, pp. 1-35.
Schulzrinne, H. et al., RPID: Rich Presence Extensions to the Presence Information Data Format (PIDF), draft-ietf-simple-rpid-10.txt, Dec. 20, 2005, pp. 1-41.
Schulzrinne, H. et al., RPID: Rich Presence Extensions to the Presence Information Data Format (PIDF), draft-ietf-simple-rpid-10.txt, Dec. 4, 2005, pp. 1-35.
Sonim Technologies, Inc., "Integrated voice and text messanging over GPRS showcased jointly by Sonim, Symbian and Texas Instruments", Sonim Press Release, Dec. 2, 2002, pp. 1-2.
Symbian Ltd., "Symbian OS Version 7.0: Functional description", Revision 1.5, Feb. 2003, pp. 1-24.
Symbian Ltd., "Symbian OS Version 7.0s: Functional description", Revision 2.1, Jun. 2003, pp. 1-29.
Symbian Ltd., "Technology: Creating Symbian OS phones", http://www.symbian.com/technology/create-symb-OS-phones.html, downloaded Nov. 5, 2003, p. 1-8.
Symbian Ltd., "Technology: Why is a different operating system needed", http://www.symbian.com/technology/why-diff-os.html, downloaded Nov. 5, 2003, pp. 1-5.
Verizon Wireless, "TXT messaging", http://www.vtext.com/customer_site/jsp/messaging_lo.jsp, downloaded Oct. 2, 2003, p. 1.
W3C, Voice Extensible Markup Language (VoiceXML) Version 2.0, W3C, www.w3.org, Feb. 20, 2003.
Yahoo!Messenger, "Yahoo!Messenger Talk for Free!", http://messenger.yahoo.com/messenger/help/voicechat.html, downloaded Oct. 2, 2003, pp. 1-2.
Advisory Action for U.S. Appl. No. 14/286,976, dated Nov. 9, 2018.
Office Action for U.S. Appl. No. 14/286,976, dated Sep. 5, 2019.
Advisory Action for U.S. Appl. No. 14/286,976, dated Nov. 13, 2019.
Office Action for U.S. Appl. No. 14/286,976, dated Oct. 7, 2020.
Advisory Action for U.S. Appl. No. 16/445,452, dated Sep. 29, 2020.

(56) References Cited

OTHER PUBLICATIONS

Notice of Allowance for U.S. Appl. No. 14/286,976, dated Oct. 29, 2020.
Notice of Allowance for U.S. Appl. No. 14/286,976, dated Mar. 29, 2021.
Office Action for U.S. Appl. No. 16/445,452, dated May 27, 2021.
Office Action for U.S. Appl. No. 16/445,452, dated Dec. 23, 2021.
Office Action for U.S. Appl. No. 16/445,452, dated Aug. 17, 2022.
PAM Specification Document, Version 1.0 ©The PAM Forum 2000-2001, Sep. 11, 2001, pp. 1-155.
Office Action for U.S. Appl. No. 16/445,452, dated Dec. 21, 2022.

* cited by examiner

ADAPTABLE COMMUNICATION TECHNIQUES FOR ELECTRONIC DEVICES

CROSS-REFERENCE TO RELATED APPLICATIONS

This application is a continuation application of U.S. patent application Ser. No. 14/286,976, filed May 23, 2014, now U.S. Pat. No. 11,019,199, and entitled "ADAPTABLE COMMUNICATION TECHNIQUES FOR ELECTRONIC DEVICES," which is hereby incorporated herein by reference, and which is a continuation application of U.S. patent application Ser. No. 13/593,483, filed Aug. 23, 2012, now U.S. Pat. No. 8,737,978, and entitled "ADAPTABLE COMMUNICATION TECHNIQUES FOR ELECTRONIC DEVICES," which is hereby incorporated herein by reference, and which is a continuation application of U.S. patent application Ser. No. 13/363,360, filed Jan. 31, 2012, now U.S. Pat. No. 8,280,419, and entitled "ADAPTABLE COMMUNICATION TECHNIQUES FOR ELECTRONIC DEVICES," which is hereby incorporated herein by reference, and which is a continuation application of U.S. patent application Ser. No. 12/987,018, filed Jan. 7, 2011, now U.S. Pat. No. 8,112,104, and entitled "ADAPTABLE COMMUNICATION TECHNIQUES FOR ELECTRONIC DEVICES," which is hereby incorporated herein by reference, and which is a continuation application of U.S. patent application Ser. No. 12/074,961, filed Mar. 7, 2008, now U.S. Pat. No. 7,890,128, and entitled "ADAPTABLE COMMUNICATION TECHNIQUES FOR ELECTRONIC DEVICES," which is hereby incorporated herein by reference, and which is a continuation application of U.S. patent application Ser. No. 11/497,651, filed Aug. 2, 2006, and entitled "ADAPTABLE COMMUNICATION TECHNIQUES FOR ELECTRONIC DEVICES," now U.S. Pat. No. 7,376,434, which is hereby incorporated herein by reference, and which is a divisional application of U.S. patent application Ser. No. 11/006,343, filed Dec. 7, 2004, and entitled "ADAPTABLE COMMUNICATION TECHNIQUES FOR ELECTRONIC DEVICES," now U.S. Pat. No. 7,116,976, which is hereby incorporated herein by reference, and which claims priority to U.S. Provisional Patent Application No. 60/527,565, filed Dec. 8, 2003, and entitled "ADAPTABLE COMMUNICATION TECHNIQUES FOR ELECTRONIC DEVICES," which is hereby incorporated herein by reference.

FIELD OF THE INVENTION

The present invention relates to electronic devices and, more particularly, to communication techniques for electronic devices.

BACKGROUND OF THE INVENTION

Typically, to participate in wireless communications, a user holds a mobile phone (e.g., wireless or a cellular phone) against his ear to hear an audio communication received in a wireless manner. The user usually also speaks towards a microphone embedded in the mobile phone to participate in the audio communication, again in a wireless manner. More recently, to facilitate hands-free operation of mobile phones, head-sets have been produced and utilized. Typically, a headset clips over or into an ear of the user to provide a speaker and a microphone in proximity to the ear and the mouth, respectively, of the user. Traditionally, the head-set was connected to the mobile phone by a cord (i.e., wire). In recent times, head-sets have been developed to operate in a wireless manner, without the need of a cord connected to the mobile phone. For example, one popular type of wireless head-set uses Bluetooth wireless transmissions to communicate between the head-set and the corresponding mobile phone.

Mobile phones often support both voice calls and text messaging. When the user does not make use of a head-set, the user often holds the mobile phone against their ear when participating in a voice call. One problem this presents is that the user is not able to see the screen of the mobile phone. As a result, the user has difficulty interacting with the keypad or screen of the mobile phone when the mobile phone is held against the user's head. Alternatively, when the user of a mobile phone makes use of a head-set, the user can receive and participate in voice calls in a hands-free manner. Unfortunately, however, the user would need to view a screen of the mobile phone to participate in text messaging.

Accordingly, there is a need for improved wireless communication techniques for users of mobile communication devices.

SUMMARY OF THE INVENTION

The invention pertains to improved approaches for users of electronic devices to communicate with one another. The electronic devices have audio and/or textual output capabilities. The improved approaches can enable users to communicate in different ways depending on device configuration, user preferences, prior history, etc. In one embodiment, the communication between users is achieved by short audio or textual messages.

According to a first aspect, improved approaches to respond to incoming voice calls are disclosed. The improved approaches enable a called party to provide some information to a calling party without directly engaging in a voice call with the calling party. The called party can choose not to take the voice call from the calling party. Instead, the called party can provide the calling party with some limited information. The limited information can be provided in an audio or textual format. In one embodiment, the limited information provides the calling party with feedback as to why the voice call was not taken.

According to a second aspect, improved approaches to respond to an incoming text message are disclosed. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

The electronic device can be a computing device, such as a personal computer, a personal digital assistant, or a communications device. One example of a communications device is a mobile telephone.

The invention can be implemented in numerous ways, including as a method, system, device, apparatus, and a computer readable medium. Several embodiments of the invention are discussed below.

In accordance with one embodiment, a mobile electronic device can be configured to support wireless communication, including messaging, for a first user. The mobile electronic device can be capable of wirelessly communicating with a wireless headset. The mobile electronic device can include at least a data storage device for storing at least computer program code, and hardware for performing at least a portion of the computer program code. The computer program code can, for example, include at least: computer program code for presenting, via said mobile electronic device, a notification of an incoming voice call for the first user, the incoming voice call being associated with a second user; computer program code for presenting an indication of each of a plurality of predetermined text messages available for selection by the first user; computer program code for detecting a selection of the indication of at least one of the predetermined text messages by the first user, the selection serving to identify a selected predetermined text message; and computer program code for initiating delivery of the selected predetermined text message to the second user in response to the incoming voice call if said computer code for detecting detects the selection of one of the predetermined messages.

In accordance with another embodiment, a method for facilitating communication amongst users of mobile electronic devices configured to support wireless communication, including messaging. The method can, for example, include at least: presenting, at the mobile electronic device, a notification of an incoming voice call for a first user, the incoming voice call being associated with a second user; presenting, at the mobile electronic device, an indication of each of a plurality of predetermined text messages available for selection by the first user; detecting, at the mobile electronic device, a selection of the indication of at least one of the predetermined text messages by the first user, the selection serving to identify a selected predetermined text message; and initiating, at the mobile electronic device, delivery of the selected predetermined text message to the second user in response to the incoming voice call if the detecting detects the selection of one of the predetermined messages.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved approaches for users of electronic devices to communicate with one another. The electronic devices have audio and/or textual output capabilities. The improved approaches can enable users to communicate in different ways depending on device configuration, user preferences, prior history, time or other criteria. In one embodiment, the communication between users is achieved by short audio or textual messages.

The electronic device can be any computing device having communication capabilities. Such computing devices can be referred to as communication devices. Examples of electronic devices include personal computers, personal digital assistants, pagers or mobile telephones.

Embodiments of the invention are discussed below with reference to FIGS. 1-7. However, those skilled in the art will readily appreciate that the detailed description given herein with respect to these figures is for explanatory purposes as the invention extends beyond these limited embodiments.

Figure 1:
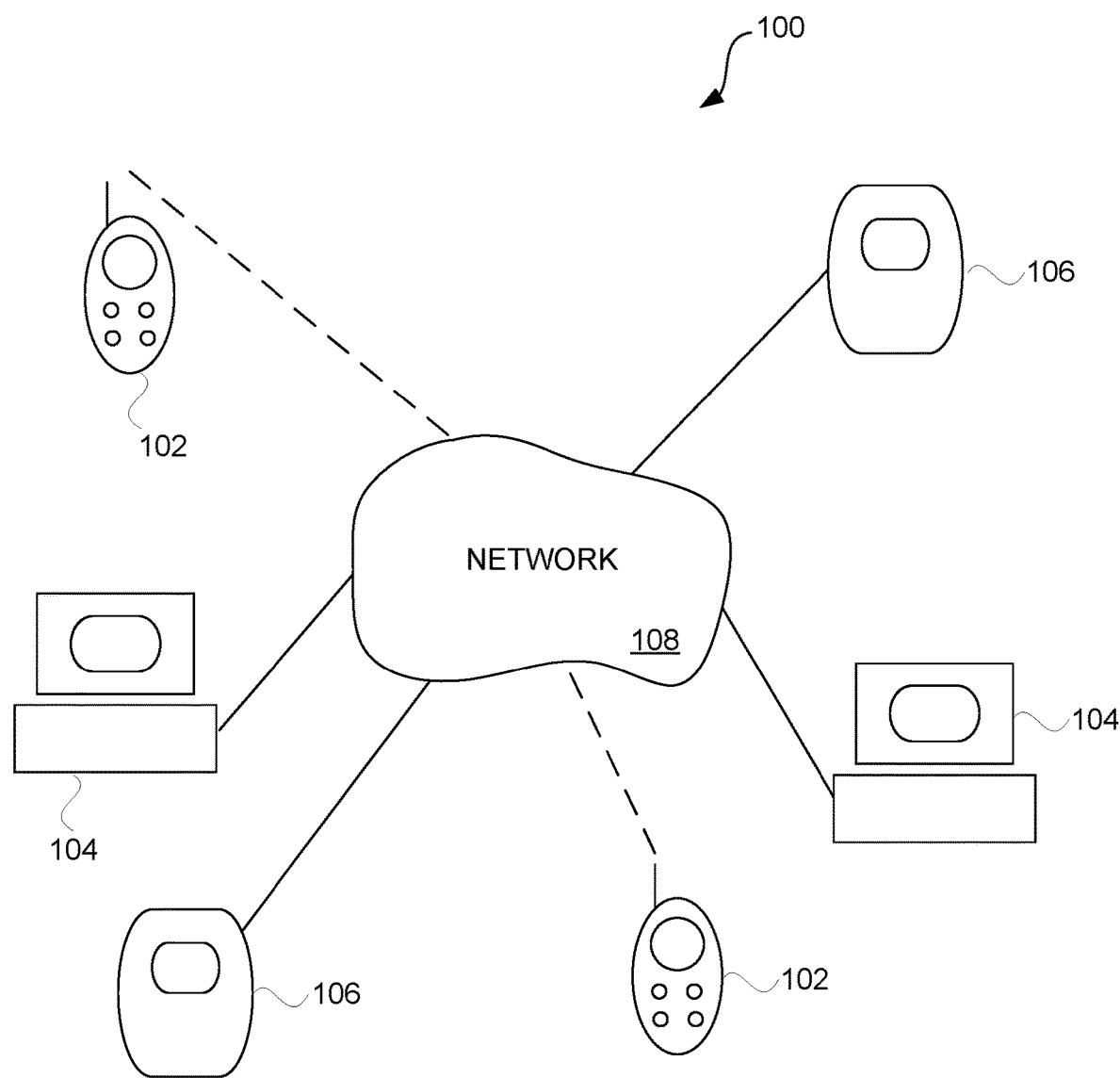
FIG. 1 is a communication system according to one embodiment of the invention.

FIG. 1 is a communication system 100 according to one embodiment of the invention. The communication system 100 can support different communication devices, including mobile telephones 102, computers 104 (e.g., personal computers) and/or wireless personal digital assistants (PDAs) 106. Users of the communication devices 102-106 can communicate with like or different communication devices. Each communication device 102-106 offers one or both of audio or textual communication capabilities. These communication devices 102-106 can inter-communicate with one another through a network 108. The network 108 can include one or more of voice networks and data networks. For example, one network is a data network providing a slow speed data channel for transmission of Short Message Service (SMS) messages (which are typically limited to 160 text characters) to a Short Message Service Center (SMSC) and then forwarded on to the destination. Besides short messages (e.g., SMS messages), the network 108 can also support other messaging protocols for sending and receiving enhanced messages (EMS), multimedia messages (MMS), email and fax messages. Other networks support faster data channels and voice channels, such as GPRS, UMTS, G4, GSM, CDMA and various protocols, such as UDP, TCP, WAP, PDP other protocols.

According to one embodiment of the invention, one of the communication devices 102-106 can send a short message to another of the communication devices 102-106. The short message can be text-based or audio-based. The sending communication device allows its user to create the short message as the user desires and/or as the device permits. For example, the user might interact with a keypad or keyboard to enter the short message, or the user might record audio inputs (e.g., speech) for the short message. The short message can then be sent to the receiving communication device. The sending of the short message may involve converting the short message from an audio message to a text message, or vice versa. Also, the receiving communication device can further convert the short message from audio-to-text or from text-to-audio. In any case, the short message is presented (e.g., displayed or played) to the user of the receiving communication device. The presentation can vary as the user desires or as the device permits.

A first aspect of the invention pertains to improved approaches to respond to incoming voice calls. The improved approaches enable a called party (i.e., a party being called) to provide some information to a calling party without directly engaging in a voice call with the calling party. The called party can choose not to take the voice call from the calling party. Instead, the called party can provide the calling party with some limited information. The limited information can be provided in an audio or textual format.

In one embodiment, the limited information provides the calling party with feedback as to why the voice call was not taken.

Figure 2:
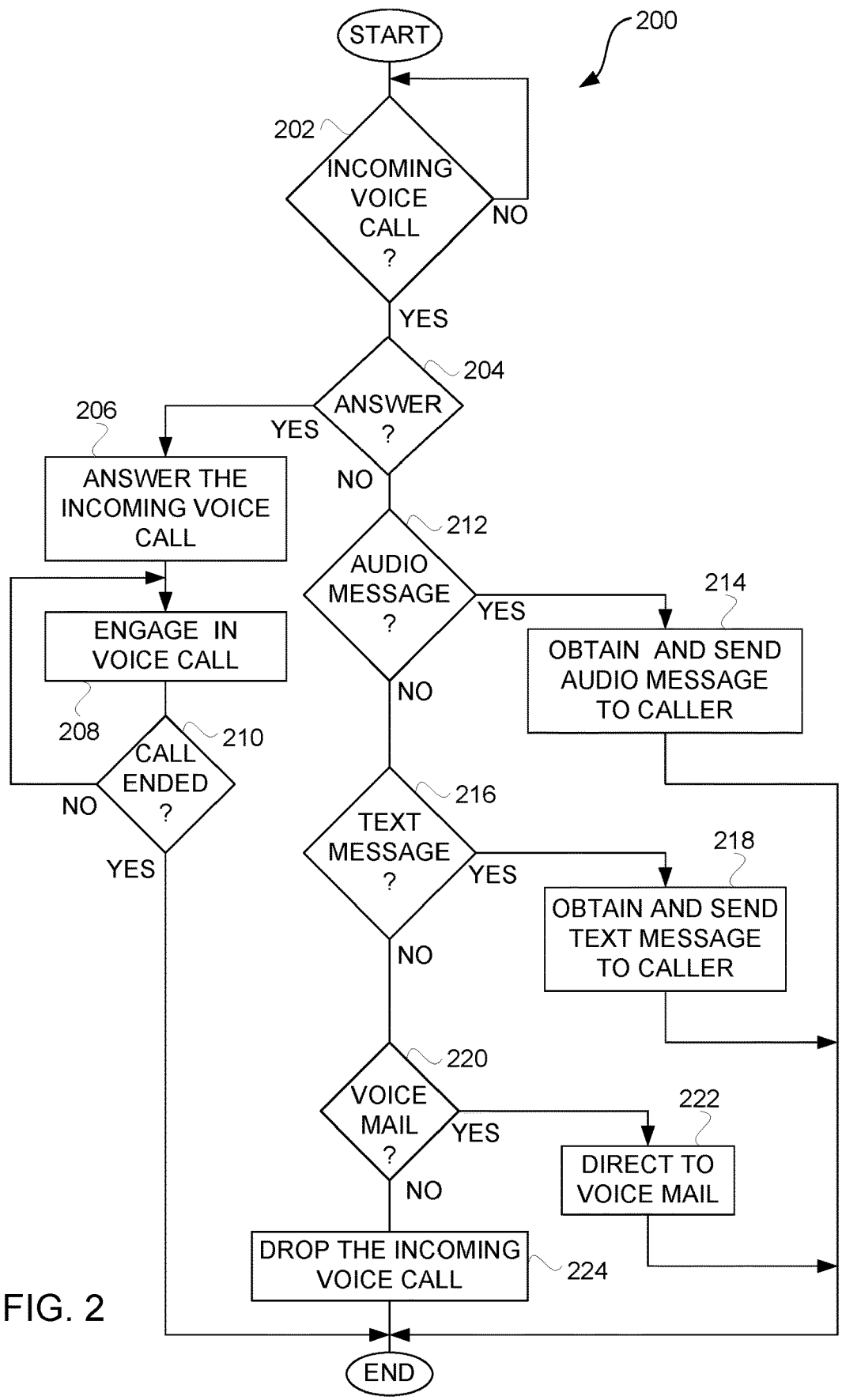
FIG. 2 is a flow diagram of a personal call response process according to one embodiment of the invention.

FIG. 2 is a flow diagram of a personal call response process 200 according to one embodiment of the invention. The personal call response process 200 is performed by an electronic device, such as a mobile communication device (e.g., mobile telephone). The personal call response process 200 begins with a decision 202 that determines whether there is an incoming voice call. When the decision 202 determines that there is no incoming voice call, then the personal call response process 200 awaits such a call. Once the decision 202 determines that there is an incoming voice call, a decision 204 determines whether the incoming voice call is to be answered. Typically, the user of the electronic device would signal the electronic device as to whether or not to answer the incoming voice call. Alternatively, the electronic device could automatically decide whether to answer the call.

When the decision 204 determines that the user desires the incoming voice call to be answered, the incoming voice call is answered 206 and the user engages 208 in a voice call with the calling party. A decision 210 then determines whether the call has ended. When the decision 210 determines that the call has not yet ended, then the personal call response process 200 can return to repeat the block 208 while the voice call continues. Once the decision 210 determines that the voice call has ended, then the personal call response process 200 ends.

When the decision 204 determines that the user does not desire to answer the incoming voice call, a decision 212 determines whether the user desires to provide an audio message to the calling party. When the decision 212 determines that the user does desire to provide an audio message to the calling party, an audio message is obtained and sent 214 to the calling party (caller).

Alternatively, when the decision 212 determines that the user does not desire to provide an audio message, a decision 216 determines whether the user desires to provide a text message to the calling party. When the decision 216 determines that the user desires to provide a text message to the calling party, a text message is obtained and sent 218 to the calling party.

Still further, when the decision 216 determines that the user does not desire to provide a text message to the calling party, a decision 220 determines whether the incoming voice call is to be directed to voice mail. When the decision 220 determines that the incoming voice call should be directed to voice mail, then the incoming voice call is directed 222 to voice mail. On the other hand, when the decision 220 determines that the incoming voice call is not to be directed to voice mail, the incoming voice call is dropped 224. Following the blocks 214, 218, 222 and 224, the personal call response process 200 is complete and ends.

In another embodiment, a personal call response process could announce the calling party to the called party (user). In announcing the calling party, the personal call response process would present the called party with information pertaining to the calling party (e.g., display or audio sound). Such information could, for example, help the called party to decide whether to answer the incoming voice call. The information can, for example, include one or more of name (individual or business), telephone number, or other caller identification. The information could also include status information of the calling party, such as position, health, mood, etc. As an example, the information could be presented to the user prior to the decision 204 of the personal call response process 200 shown in FIG. 2.

In still another embodiment, an automated decision process to decide whether to answer a call can be based on time (e.g., decision 204). For example, the called party can previously set a rule, such as that from midnight to 6 am, the party does not want to answer voice calls. Then, during this time period, the electronic device can automatically decide not to answer incoming calls. In one implementation, when the electronic device decides not to answer incoming calls, no indication of incoming calls will be provided to the called party. For example, from midnight to 6 am, the device would not produce any ring tone. Additionally, if desired, the called party can also configure the electronic device to automatically provide an audio message or a text message to the calling party (e.g., I'm asleep call me tomorrow").

Figure 3:
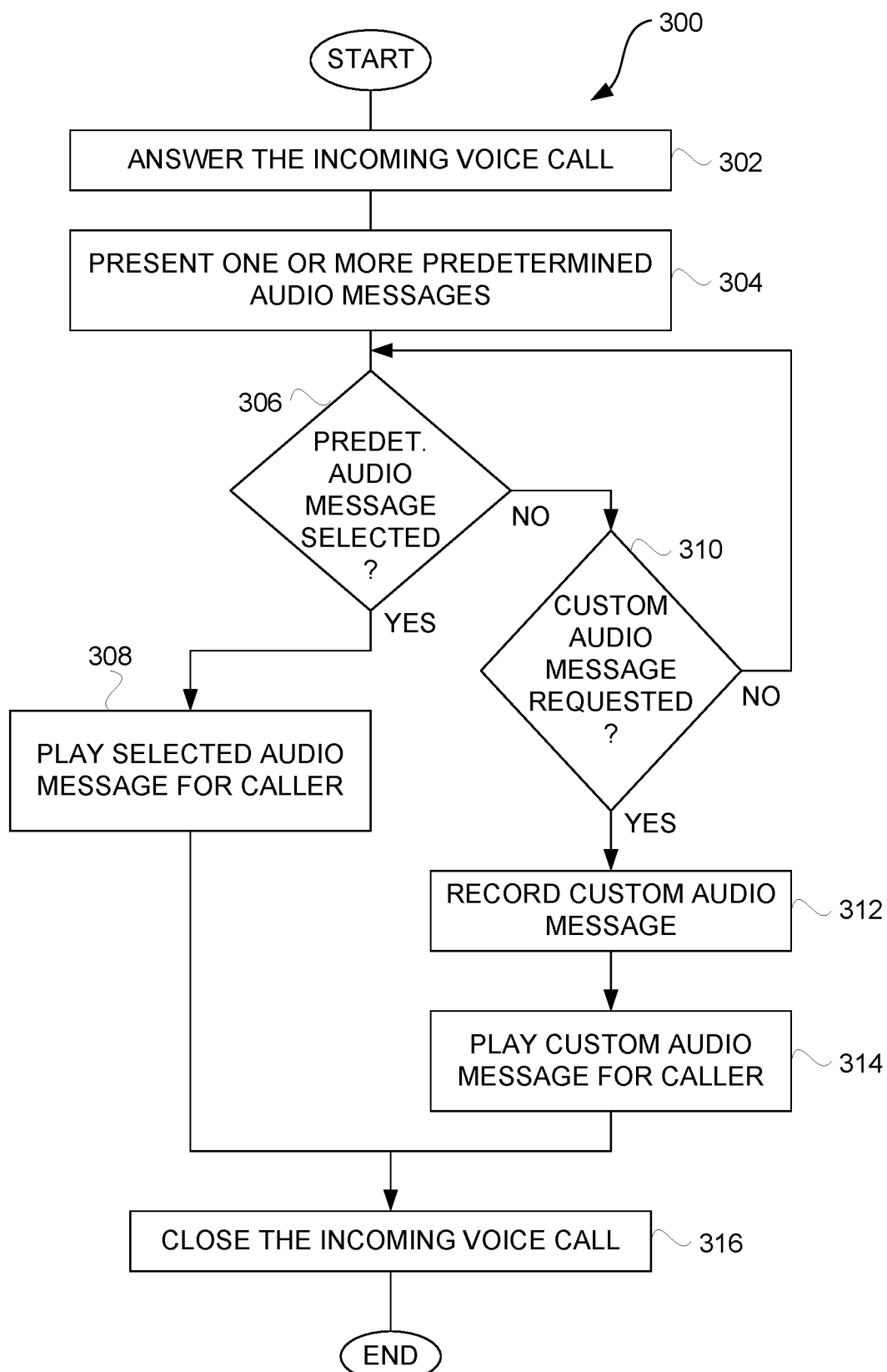
FIG. 3 is a flow diagram of an audio message response process according to one embodiment of the invention.

FIG. 3 is a flow diagram of an audio message response process 300 according to one embodiment of the invention. The audio message response process 300 is, for example, suitable for use as the processing carried out by block 214 illustrated in FIG. 2.

The audio message response process 300 initially answers 302 the incoming voice call. In this operation, the incoming voice call is answered 302 but not in a traditional way. Instead, the electronic circuitry associated with a mobile communication device (e.g., mobile telephone) that receives the incoming voice call operates to answer the incoming voice call for purposes of an audio message response. For example, a voice channel is established between the calling party and the mobile communication device, but the speaker and microphone of the mobile communication device are disabled. In effect, in such an embodiment, neither the called party nor the calling party perceives that the voice calling has been answered.

Next, one or more predetermined audio messages can be presented 304 by the mobile communication device. The presentation 304 of the one or more predetermined audio messages can, for example, be achieved by audio or visual means. For example, the predetermined audio messages can be audio output to a speaker associated with the mobile communication device for the called party or can be visual output (e.g., text) to a display of the mobile communication device for the called party (e.g., user of the mobile communication device).

A decision 306 then determines whether a predetermined audio message has been selected. Here, the decision 306 determines whether the user (i.e., called party) of the mobile communication device has selected one or more of the predetermined audio messages. When the decision 306 determines that a predetermined audio message has been selected, then the selected audio message is played 308 for the calling party. Here, the mobile communication device can output the selected audio message to the calling party over the voice channel. Typically, the mobile communication device of the called party would not produce an audible output at the mobile communication device, so that the called party would not be disturbed by the sending of the audio response. The predetermined audio messages are normally short messages (e.g., not more than 160 characters) so that the duration of time the voice channel is needed and/or the amount of network bandwidth consumed is minimal.

On the other hand, when the decision 306 determines that none of the predetermined audio messages have been selected, then a decision 310 determines whether a custom audio message is requested. A custom audio message is an audio message that is specifically provided for the calling party. When the decision 310 determines that a custom audio message is not being requested, then the audio message response process 300 returns to repeat the decision 306 and subsequent operations. Alternatively, when the decision 310 determines that a custom audio message is requested, then a custom audio message is recorded 312. Thereafter, the custom audio message that has been recorded can be played 314 for the calling party (caller). Here, typically, the custom audio message would be output by the mobile communication device of the called party over the voice channel to the calling party. Typically, the mobile communication device of the called party would not produce an audible output at the mobile communication device, so that the called party would not be disturbed by the sending of the audio response. The custom audio messages are also normally short messages (e.g., not more than 160 characters) so that the duration of time the voice channel is needed and/or the amount of network bandwidth consumed is minimal.

Following the operations 308 and 314, the incoming voice call is closed 316. In other words, after the selected audio message or the custom audio message is played 308, 314, the incoming voice call can be closed 316. Following the block 316, the audio message response process 300 is complete and ends.

The predetermined audio messages that are presented 304 to a called party can be determined in a static or dynamic manner. A static determination would, for example, be when the called party has previously set or recorded an audio message to be utilized. Typically, with static determination, the list of audio messages remains the same (i.e., static) until changed (e.g., by the called party). A dynamic determination would allow the audio messages in the list (or the ordering of the audio messages in the list) to change without specific action by the user or the called party. For example, the list or ordering of the audio messages can depend on preference settings, configuration information, or prior usage. Prior usage can include biasing the list of audio messages such that those messages being most often selected appear higher in the list. The list or ordering of the audio messages can also depend on the calling party, type of calling party, location of calling party or called party, and the like. The list of audio messages can be represented by text and/or graphics (e.g., icons).

The audio message response process 300 flexibly enables a user to either select one or more predetermined audio messages or provide a custom audio message to be used as an audio message response to a calling party. However, it should be recognized that, in other embodiments, an audio message response process can alternatively simply pertain to only providing a custom audio message, or only permitting selection of a predetermined audio message. Further, in still other embodiments, an audio message response process can first determine whether a custom audio message is to be provided before presenting predetermined audio messages. In yet other embodiments, an audio message response process can answer the incoming voice call later in the processing than operation 302 as shown in FIG. 3 (e.g., before operations 308 and 314).

Figure 4:
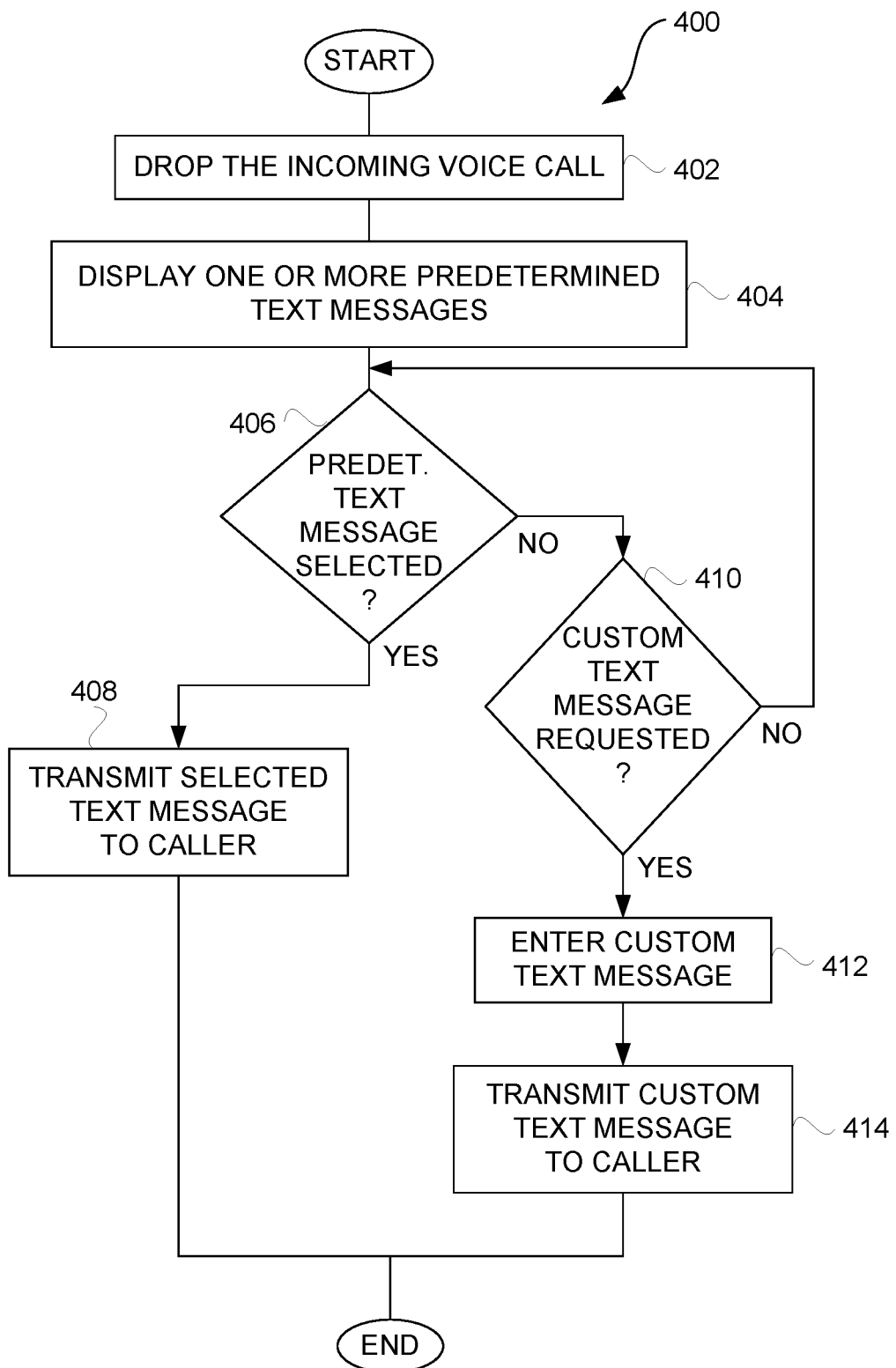
FIG. 4 is a flow diagram of a text message response process according to one embodiment of the invention.

FIG. 4 is a flow diagram of a text message response process 400 according to one embodiment of the invention. The text message response process 400 is, for example, processing performed by the block 218 illustrated in FIG. 2.

The text message response process 400 initially drops 402 the incoming voice call. Here, the information to be supplied to the calling party is a short text message; therefore, there is no need for a voice channel.

Next, one or more predetermined text messages are displayed 404. Here, the one or more predetermined text messages would normally be displayed on a display screen associated with the mobile communication device being utilized by the called party. A decision 406 then determines whether one (or more) of the predetermined text messages has been selected. When the decision 406 determines that a predetermined text message has been selected, then the selected text message is transmitted 408 to the caller (i.e., the calling party).

On the other hand, when the decision 406 determines that a predetermined text message has not been selected, then a decision 410 determines whether a custom text message is requested. When the decision 410 determines that a custom text message is not requested, then the text message response process 400 returns to repeat the decision 406 and subsequent operations. Alternatively, when the decision 410 determines that a custom text message is requested, then the custom text message is entered 412. Here, the called party interacts with the mobile communication device to enter the custom text message. Then, the custom text message is transmitted 414 to the caller. In one embodiment, the transmission 408, 414 of the text message can be performed over a communication network, such as a network having a Short Message Service Center (SMSC) supporting Short Message Service (SMS) messages. Following the transmission 408 of the selected text message or the transmission 414 of the custom text message, the text message response process 400 is complete and ends.

An alternative embodiment of a text message response process could operate to answer the incoming voice call and announce to the caller that a text message will be forthcoming. Then, the incoming voice call could be promptly dropped. This additional operation could, for example, be used with the text message response process 400 by providing an additional operation prior to the block 402 illustrated in FIG. 4.

The predetermined text messages being displayed 404 to a called party can be determined in a static or dynamic manner. A static determination would, for example, be a text message the called party has previously set or entered. Typically, with static determination, the list of text messages remains the same (i.e., static) until changed (e.g., by the called party). A dynamic determination would allow the text messages in the list (or the ordering of the text messages in the list) to change automatically, and not by the user. For example, the list or ordering of the text messages can depend on preference settings, configuration information, or prior usage. To illustrate, prior usage can include biasing the list of text messages such that those messages being most often selected appear higher in the list. The list or ordering of the text messages can also depend on the calling party, type of calling party, location of calling party or called party, and the like. The list of text messages can identify each text message with text (e.g., at least a portion of the corresponding text message, or an abbreviation) and/or graphics (e.g., icons).

The text message response process 400 flexibly enables a user to either select one or more predetermined text messages or provide a custom text message to be used as a text message response to a calling party. However, it should be recognized that, in other embodiments, a text message response process can alternatively simply pertain to only providing a custom text message, or only permitting selection of a predetermined text message. Further, in still other embodiments, a text message response process can first determine whether a custom text message is to be provided before presenting predetermined text messages.

Figure 5:
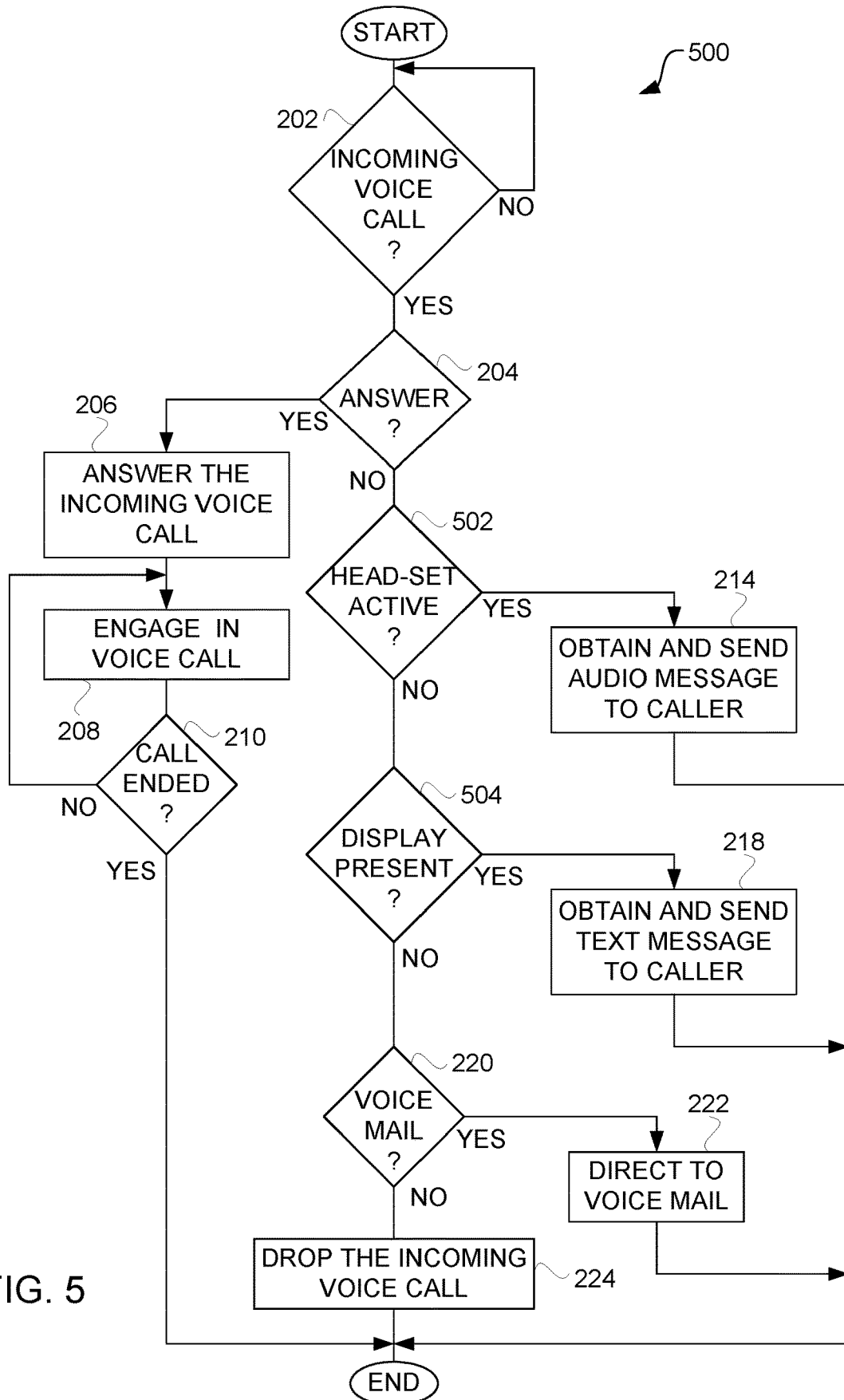
FIG. 5 is a flow diagram of an automated call response process according to one embodiment of the invention.

FIG. 5 is a flow diagram of an automated call response process 500 according to one embodiment of the invention. The automatic call response process 500 is substantially similar in many ways to the personal call response process 200 illustrated in FIG. 2. However, the automated call response process 500 operates to reduce user input at the mobile communication device by making use of stored data pertaining to its hardware components, configuration or preferences. In this regard, the automatic call response process 500 includes a decision 502 that determines whether a head-set is active. When the decision 502 determines that a head-set is active, then the automatic call response process 500 can prefer, suggest or require the user to obtain and send 214 an audio message to the caller in response to an incoming voice call. Alternatively, when the decision 502 determines that a head-set is not active, then a decision 504 can determine whether a display is present. In other words, the decision 504 can determine whether the mobile communication device has a display. When the decision 504 determines that the mobile communication device does have a display, then the mobile communication device can operate to obtain and send 218 a text message to the caller. Of course, this assumes that the caller can support text messages even though they initially called with a voice call. Hence, in another embodiment, the automatic call response process can operate to query or obtain information regarding the caller's communication device capabilities.

An exemplary scenario of how the previously described automatic call response process could work according to one implementation is as follows:

1. From his mobile phone, Bill calls Tom's mobile phone.

2. Tom is alerted by his mobile phone of an incoming call. Optionally, caller information (i.e., pertaining to Bill) can be displayed or announced to Tom.

3. Tom can choose to answer the incoming call or decline to answer the call.

4. In the event that Tom declines to answer the call, Tom can have the opportunity to provide the caller with a brief audio or text message.

5. If an audio message is to be provided, then Tom can either record a personalized message or select one of a plurality of predetermined audio messages. In this case, the incoming call is answered by Tom's mobile phone and then the audio message is played for the caller, thereafter the call is dropped. The audio messages are typically brief (i.e., short), and examples of audio messages are: (i) "Will call in 10 minutes," (ii) "Cannot talk now," (iii) "I'm in a meeting," or (iv) "Please don't call anymore."

6. On the other hand, if a text message is to be provided, then Tom can either enter a personalized text message or select from a plurality of predetermined text messages. In this case, the incoming call is dropped, and the entered text message or the selected one of the predetermined text messages is sent. Examples of text messages are: (i) "Will call in 10 minutes," (ii) "Cannot talk now," (iii) "I'm in a meeting," or (iv) "Please don't call anymore." The text messages can be English (or other language) words or phrases, or can be condensed text strings (e.g., such as slang or chat language). In one embodiment, the predetermined text messages presented to Tom can be dependent on some criteria (i.e., automatically selected). Alternatively, it is possible that Tom might want to edit the predetermined text message, such can be permitted. As yet another example, the text message can embed dynamic information, such as position, e.g., "I'm in [position] now, so I'll get back to you later." The position can be determined using a GPS receiver in the mobile phone or acquired by a remote computer and provided to the mobile phone. The position may also be further processed (locally or remotely) into a more user-friendly form, such as city, school, restaurant name, or street type addresses. The position could also be used above to assist the user in deciding whether to answer the incoming call or decline to answer the call.

7. If hardware components, configuration or preferences are taken into consideration, as illustrated in FIG. 5, the above scenario can be modified. For example, if Tom is using a head-set with his mobile phone, then an audio message may be most convenient, assuming that Tom wants to provide a particular (i.e., customized) message to Bill. The head-set allows Tom to record a brief audio message. Less conveniently, the head-set can be used to present a list of predetermined audio messages and allow Tom's selection therefrom by a button or voice-command.

8. If Tom is not using a head-set, then a text message response might be more suitable. This would typically require that Tom's mobile phone have a display and a keypad. Even so, without a head-set, Tom could still record an audio message, though such would likely be less convenient.

9. Tom can also not provide an audio message or a text message and simply let the incoming call roll-over into voice mail.

The exemplary scenario can also be used in a case where the called party is using one line but the mobile device has multi-line capabilities or call waiting. In such case, the mobile phone can enable the called party to provide a brief audio or text message to the calling party as noted above. Alternatively, the mobile phone can itself automatically (i.e., without user input) respond to the calling party via an audio or text message since the mobile phone is aware that the called party is on the other line.

In this aspect of the invention, the calling party and the called party often use mobile communication devices, such as mobile phones. However, the parties can alternatively use other electronic devices, such as a PDA, a computer, etc. Further, the option to provide a text response could be prevented if the caller's device is known to not support text messages.

The advantages of the previously described embodiments are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. In still another advantage, a user can provide feedback to a caller without answering a voice call from the caller.

Another aspect of the invention pertains to improved approaches to respond to an incoming text message. The improved approaches enable a recipient to provide a reply message to an initiator. The incoming text message can be presented to the recipient with an audio or textual presentation. Thereafter, a reply text message can be sent back to the initiator. The recipient can form the reply text message by recording a brief audio message or entering a text message. In the case in which a brief audio message is used, the audio message can be automatically converted to a text message before being transmitted to the initiator.

Figure 6:
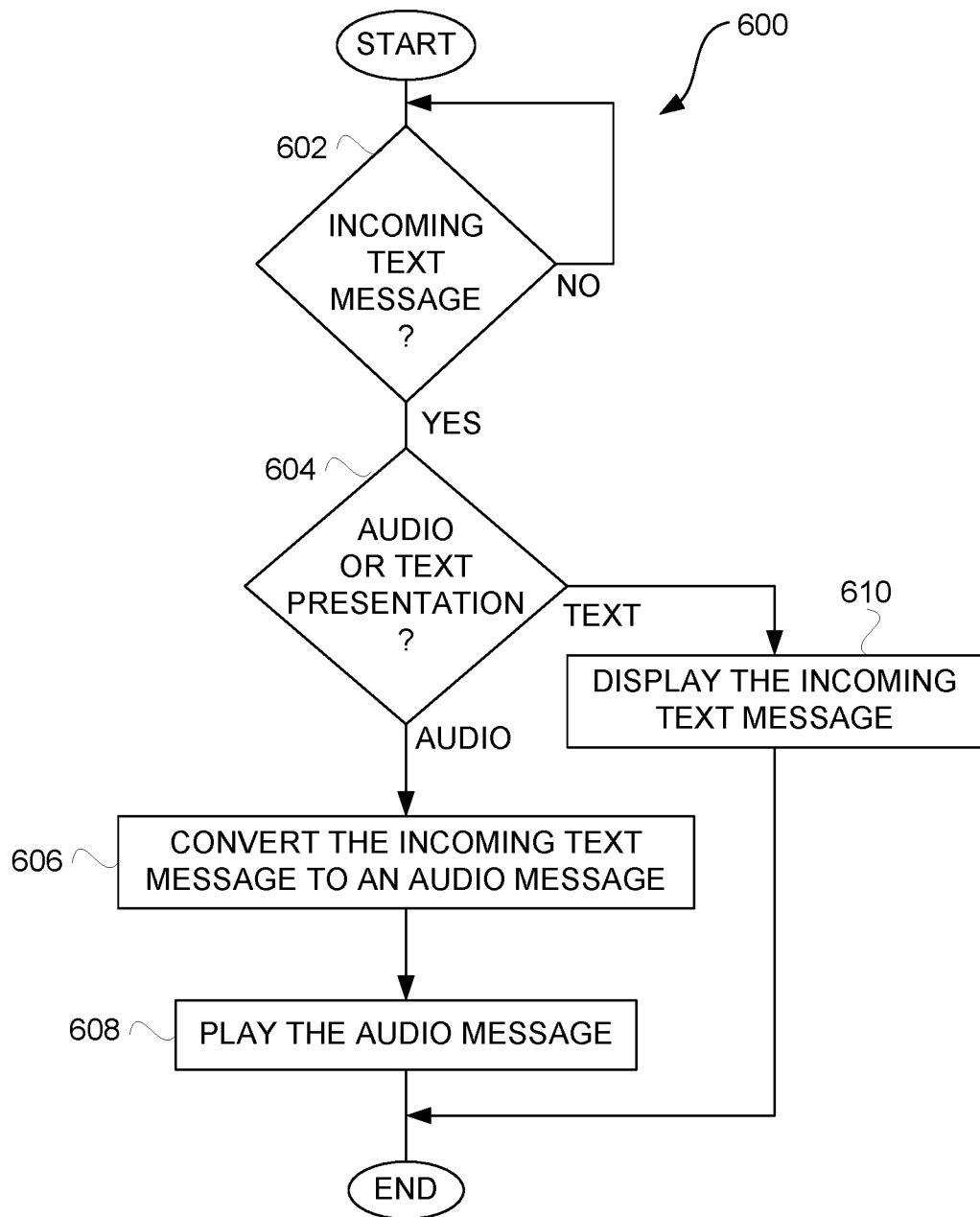
FIG. 6 is a flow diagram of a message presentation process according to one embodiment of the invention.

FIG. 6 is a flow diagram of a message presentation process 600 according to one embodiment of the invention. The message presentation process 600 is performed by an electronic device, such as a mobile communication device.

The message presentation process 600 begins with a decision 602 that determines whether an incoming text message is present. Typically, the incoming text message would be transmitted to the mobile communication device from another communication device. When the decision 602 determines that an incoming text message is not present, then the message presentation process 600 awaits such message. Once the decision 602 determines that an incoming text message has been received, a decision 604 determines whether an audio or text presentation is to be utilized. The decision 604 can be performed in a variety of different ways. For example, the determination of whether to utilize an audio or text presentation can be based on user input or can be automatically determined through a use of configuration or preference information or hardware components (e.g., display, speaker, head-set).

When the decision 604 determines that an audio presentation is to be utilized, the incoming text message is converted 606 to an audio message. For example, a text-to-speech conversion can be performed. In one embodiment, a user of the electronic device can be permitted to choose speech characteristics, such as a voice, tone, pace, accent, or mood, for the resulting speech. For example, a user could choose speech characteristics by preference settings. In another embodiment, the incoming text message can include or reference speech characteristics so that the initiator can control or influence speech characteristics. In still another embodiment, if the text to be converted contains condensed text (e.g., such as slang or chat language), the resulting speech can pertain to an uncondensed form of the text. The ability to convert from condensed text to resulting speech for uncondensed text can be facilitated by pattern matching. For example, in chat language "LOL" can be converted to an audio message for "lots of love." In one implementation, a table can store audio messages corresponding to chat terms or phrases. In another implementation, a first table would store uncompressed terms or phrases corresponding to chat terms or phrases, and a second table would store audio messages corresponding to the uncompressed terms or phrases.

After the incoming text message is converted to the audio message, the audio message is played 608. Typically, the audio message is played 608 by the mobile communication device for the user. For example, the audio message can be output to a speaker of the mobile communication device or a headset used therewith. As a result, the user of the mobile wireless communication device receives an audio message even though the incoming message was a text message.

On the other hand, when the decision 604 determines that a text presentation is to be utilized, the incoming text message is displayed 610. Here, the incoming text message would be displayed 610 on a display associated with the mobile communication device. Following the blocks 608 and 610, the message presentation process 600 ends.

As discussed above, text-to-speech conversion can be invoked and performed on an electronic device, which may be a mobile communication device. While text-to-speech conversion, particularly if high quality is desired, requires substantial processing capabilities, mobile electronic devices, such as mobile communication devices, given their small form factor and price competition, tend to have limited processing capability. Accordingly, in one embodiment, text-to-speech conversion can be off-loaded from the mobile device. For example, a remote server computer can be provided the text message and produce the resulting audio message, and then supply the audio message to the mobile device. The remote server computer can be a networked server coupled to the network 108. One example of a networked server is a gateway computer for a wireless electronic device, such as a mobile telephone.

Figure 7:
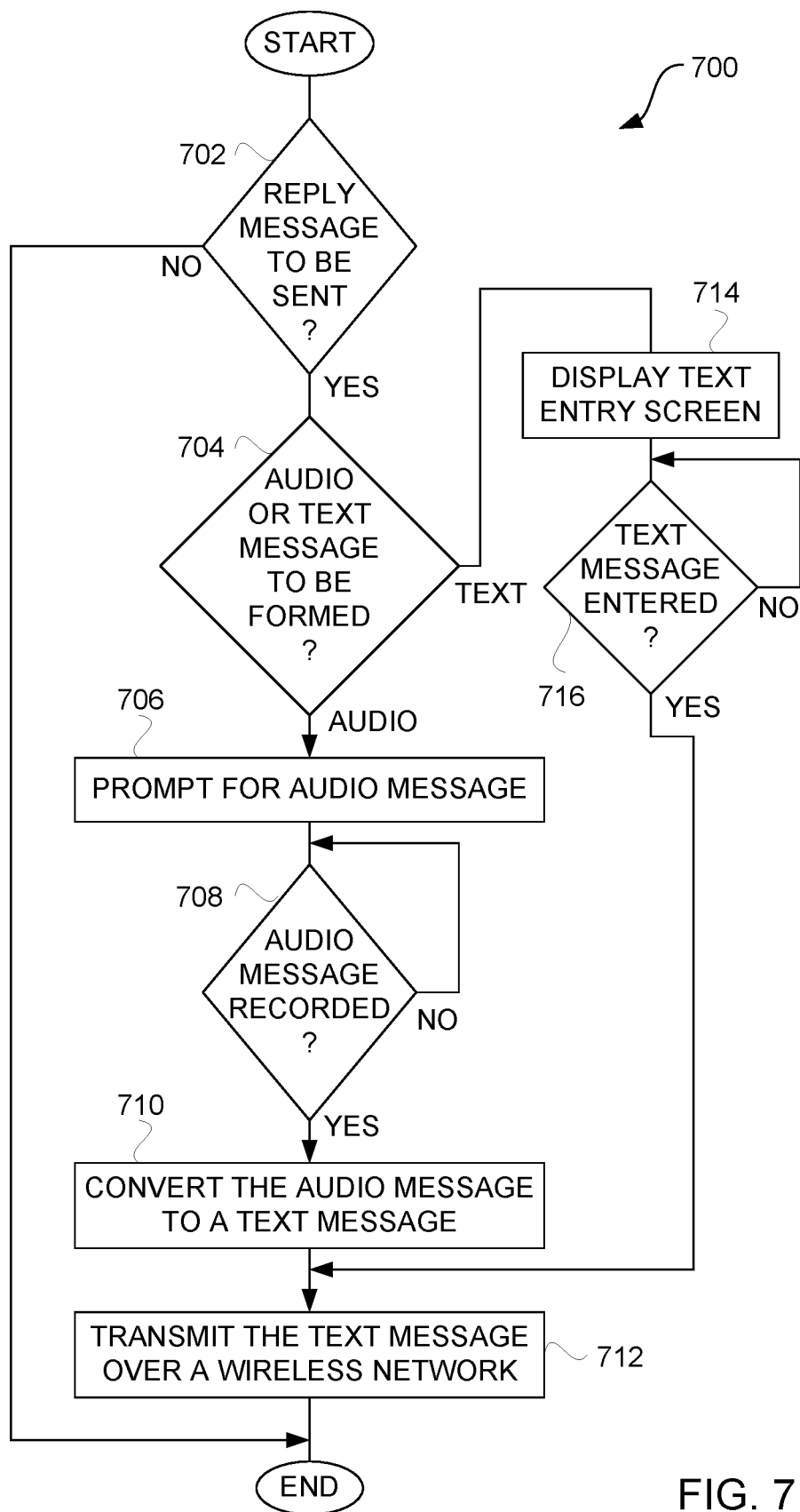
FIG. 7 is a flow diagram of a reply message process according to one embodiment of the invention.

FIG. 7 is a flow diagram of a reply message process 700 according to one embodiment of the invention. The reply message process 700 is performed by an electronic device, such as a mobile communication device.

The reply message process 700 begins with a decision 702 that determines whether a reply message is to be sent. Typically, the reply message process 700 follows the presentation of an incoming text message to a user of a mobile communication device. Hence, the reply message to be sent is a reply to the incoming text message. However, in other embodiments, the reply message to be sent can be merely an initial message as opposed to a response to an earlier message.

In any case, when the decision 702 determines that a reply message is not to be sent, then the reply message process 700 ends or simply awaits the need to send a reply message. On the other hand, when the decision 702 determines that a reply message is to be sent, then a decision 704 determines whether an audio or text message is to be formed. The decision 704 can be performed in a variety of different ways. For example, the determination of whether to send an audio or text message can be based on user input or can be automatically determined through a use of configuration or preference information or hardware components (e.g., display, speaker, head-set).

When the decision 704 determines that an audio message is to be formed, then the reply message process 700 prompts 706 for an audio message. Here, the prompt 706 can be directed to the user of the mobile communication device. The prompt can be an audio or textual indication. Next, a decision 708 determines whether an audio message has been recorded. When the decision 708 determines that the audio message has not been recorded, then the reply message process 700 awaits the audio message. Once the decision 708 determines that the audio message has been recorded, then the audio message is converted 710 to a text message. In one embodiment, if the audio message recorded is greater than a maximum text message size (e.g., 150 or 160 characters), then the audio message can be shortened so that the resulting text message does not exceed the maximum text message size. One way to shorten the text message is to use abbreviations. For example, the words "For example" can be changed to "e.g.". Such conversion can be again be performed by matching entries in tables. Another way to shorten is to remove non-essential text. Still another way to shorten is to clip off or truncate the text message at the maximum text message size. In another embodiment, the resulting text message might provide an indication that it was converted from an audio message. Following the block 710, the text message is transmitted 712 over a wireless network.

Alternatively, when the decision 704 determines that a text message is to be formed, then a text entry screen is displayed 714. Next, a decision 716 determines whether a text message has been entered. When the decision 716 determines that a text message has not yet been entered, then the reply message process 700 awaits entry of the text message. Once the text message has been entered, the text message is transmitted 712 over the wireless network. Following the block 712, the reply message process 700 ends.

Although the reply message process 700 provides for the user to enter a custom text or audio message, it should be understood that the reply message can alternatively be formed through use of semi-custom or predetermined reply messages from which the user of the mobile communication device can choose. The use of semi-custom or predetermined reply messages can be achieved as noted above in a number of embodiments, and can serve to simplify the conversion process.

An exemplary scenario of how message presentation and reply message processes could work according to one implementation of the second aspect is as follows:

1. From his mobile phone, Bill prepares and sends a text message to Tom's mobile phone.

2. Tom is alerted by his mobile phone of an incoming text message, such as by displaying at least a portion of the text message and/or otherwise notifying Tom of the text message.

3. Tom's mobile phone can decide whether to present the text message on a display screen of Tom's mobile phone, or to first convert the text message to an audio message and then present the audio message to Tom (e.g., play the audio message). Of course, Tom can interact with Tom's mobile phone to assist in making the determination on how to present the message.

4. Thereafter, if desired, Tom can prepare and send a reply message back to Bill. This reply message can be prepared initially as a text message or an audio message. Tom's mobile phone and/or Tom can determine whether the reply message is initially prepared as a text message or as an audio message. If an audio message is initially created, such audio message must be converted to a text message prior to transmission. Eventually, the reply message is sent to Bill as a text message. Tom's mobile phone can assist with the creation of the reply message through use of custom, semi-custom or predetermined reply message from which Tom and/or Tom's mobile phone can choose.

5. If Tom is using a head-set with his mobile phone, then an audio message may be more convenient, assuming that Tom wants to provide a particular (i.e., customized) message to Bill. The head-set allows Tom to easily record a brief audio message. Less conveniently, the head-set can be used to present a list of predetermined audio messages and allow Tom's selection therefrom by a button or voice-command.

6. If Tom is not using a head-set, then a text message response might be more suitable. This would typically require that Tom's mobile phone have a display and a keypad. Even so, without a head-set, Tom could still record an audio message, though such would likely be less convenient.

7. Tom can also not provide a reply message and simply not respond to the incoming text message. Alternatively, Tom can configure his mobile phone to automatically produce and send a reply message based on user settings or preferences, position, configuration, status, etc.

In this aspect of the invention, the calling party and the called party often use mobile communication devices, such as mobile phones. However, the parties can alternatively use other electronic devices, such as a PDA, a computer, etc.

The advantages of the invention exemplified by FIGS. 6-7 are numerous. Different embodiments or implementations may yield different advantages. One advantage is that communications for users of electronic devices can be flexibly provided. Another advantage is that communication mode changes can be performed at an electronic device to better suit the needs or condition of the electronic device or user preferences. Still another advantage is that conversion of an audio message to a text message facilitates use a low cost network (such as the SMS network). Another advantage is reduced network bandwidth load. Yet still another advantage is that the sender can get back a message in the same format as they sent the original message, though the recipient may use the message in a different format or mode (e.g., recipient hears the text message as an audio message).

Moreover, it should be noted that with regards to any of the embodiments in which a voice call or a text message is incoming to an electronic device, not only can the user of the mobile device take an action (e.g., button press or voice-command) to decline the call/message but also the electronic device itself can automatically decline the call/message such that the user is not disturbed. For example, an electronic device can be configured through user settings (e.g., preferences) to decline calls/messages matching certain criteria. Also, an auto reply message can be configured to be automatically sent in response to the call/message. For a known, undesired marketing caller/message sender, the electronic device can automatically send a reply message demanding the sender not to call or send messages anymore, and to remove your information from their database.

Text messages received or sent can optionally embed indications of speech characteristics to be used, should the text message be converted to an audio format. The speech characteristics can pertain to voice, tone, pace, accent, and/or mood. The speech characteristics for the resulting speech can be set in preference or configuration information, set on a per message basis by users, or set by evaluation of monitored data pertaining to the user.

Additionally, the messages being transmitted can be encrypted for security purposes.

In one embodiment, an electronic device performing communications using audio and/or text messages according to the invention can further integrate (or have tethered thereto) one or more electrical components for enhancing the hearing of the user of the electronic device. The electronic device will normally include a microphone and a speaker. In any case, additional details on hearing enhancement are further described, for example, in U.S. Provisional Patent Application No. 60/620,238, filed Oct. 18, 2004, and entitled "EYEGLASSES WITH HEARING ENHANCED AND OTHER AUDIO SIGNAL-GENERATING CAPABILITIES," which is hereby incorporated herein by reference;

The invention described herein can be considered an automated secretary for a user of an electronic device. The automated secretary can completely or partially respond to an incoming call/message so as to reduce disturbances to the user. The user can personalize the automated secretary through user settings (e.g., preferences), or the automated secretary can learn over time how to handle different incoming calls/messages. Besides handling or assisting the user with incoming calls/messages, the automated secretary can also assist with other activities, such as making calendar entries (e.g., meetings) in a calendar or responding to incoming callers/messages with relevant information pertaining to the user's schedule as maintained by the calendar (though the user could restrict such access to certain information and/or inquiring parties). For example, if an incoming text message asks "available for lunch today?", the automated secretary can check the user's availability for lunch by way of the user's calendar, then if the user is not available the automated secretary can quickly informing the inquiring party of same or propose another date. On the other hand, if the lunch time period is available in the user's calendar, then the automated secretary can either directly respond to the inquiring party of acceptance or propose a response to the user for review, modification and/or transmission.

Furthermore, the embodiments implementations and features described in: (i) U.S. Provisional Patent Application 60/509,631, filed Oct. 9, 2003, and entitled "TETHERED ELECTRICAL COMPONENTS FOR EYEGLASSES," which is hereby incorporated herein by reference; and (ii) U.S. Provisional Patent Application 60/462,591, filed Apr. 15, 2003, and entitled "EYEGLASSES FOR WIRELESS COMMUNICATION," which is hereby incorporated herein by reference; (iii) U.S. patent application Ser. No. 10/964,011, filed Oct. 12, 2004, and entitled "TETHERED ELECTRICAL COMPONENTS FOR EYEGLASSES," which is hereby incorporated herein by reference; and (iv) U.S. patent application Ser. No. 10/822,218, filed Apr. 12, 2004, and entitled "EYEGLASSES FOR WIRELESS COMMUNICATIONS," which is hereby incorporated herein by reference, can be used with the various embodiments, implementations, features and aspects of the invention noted above. For example some or all of the processing noted above with respect to FIGS. 1-7 can be performed in electrical components integral or tethered to eyeglasses. However, the electrical components integral or tethered to eyeglasses can also interact and/or share processing tasks with an electrical device (e.g., mobile telephone, PDA, etc.) located proximate thereto.

It should be obvious to those skilled in the art that a number of embodiments performing communications using voice as well as audio and/or text messages can be implemented using voice over Internet Protocol technologies, with signals delivered over the Web. For example, a calling party's communication or mobile device can include an adapter to convert voice signals to data packets before sending them over the Internet. A service provider can convert the packets back into voice signals before sending the voice signals to the called party's communication device. Similarly, embodiments can be implemented using voice over wireless protocols, such as Wi-Fi or Wi-Max networks. Using such technologies, computing devices can become communication devices.

The various embodiments, implementations, features and aspects of the invention noted above can be combined in various ways or used separately. Those skilled in the art will understand from the description that the invention can be equally applied to or used in other different settings with respect to various combinations, embodiments, implementations or features provided in the description herein.

The invention can be implemented in software, hardware or a combination of hardware and software. A number of embodiments of the invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for facilitating communication amongst users of mobile electronic devices having displays and configured to support wireless communication, including voice and text communications, the method comprising:

receiving, at a recipient mobile electronic device, an incoming voice call for a recipient user, the incoming voice call being initiated by a sending user using a sender mobile electronic device;

displaying, on a display of the recipient mobile electronic device, at least an indication of the incoming voice call;

receiving, at the recipient mobile electronic device, a recipient user input in response to the displaying of the indication of the incoming voice call;

displaying, after the recipient user input is received and in response to the recipient user input, at least a predetermined text message on the display of the recipient mobile electronic device;

answering, after the recipient user input is received and in response to the recipient user input, the incoming voice call to establish a voice channel between the recipient mobile electronic device and the sender mobile electronic device without the recipient user perceiving that the incoming voice call has been answered;

obtaining, at the recipient mobile electronic device, a predetermined audio message having the same message content as the predetermined text message;

causing, after the answering of the incoming voice call, the predetermined audio message to be provided from the recipient mobile electronic device to the sender mobile electronic device in an audio manner over the voice channel so that the sending user is able to receive the predetermined audio message, the predetermined audio message being provided over the voice channel to the sender mobile electronic device having the same message content as the predetermined text message that is displayed by the displaying of the predetermined text message on the display of the recipient mobile electronic device; and causing, after the answering of the incoming voice call, at least a reply message to be provided from the recipient mobile electronic device to the sender mobile electronic device upon determining that the sending user is deemed an undesired caller, the sending user being able to receive the reply message via the sender mobile electronic device, and the reply message instructing the sending user to not call again or to remove the recipient user's information;

configuring a voice characteristic to be used by the recipient mobile electronic device, the voice characteristic being used for predetermined audio messages by the recipient mobile electronic device;

enabling the user of the recipient mobile electronic device to change the voice characteristic being used for predetermined audio messages by the recipient mobile electronic device;

wherein the predetermined audio message being provided over the voice channel to the sender mobile electronic device presents the predetermined audio message using the voice characteristic used by the recipient mobile electronic device.

2. A method as recited in claim 1, wherein the method comprises:

closing the incoming voice call after the predetermined audio message has been provided to the sender mobile electronic device.

3. A method as recited in claim 1, wherein the method comprises:

permitting the recipient user to interact with the recipient mobile electronic device to decline the incoming voice call from the sending user.

4. A method as recited in claim 1, wherein the voice characteristic is based on at least one of a voice, tone, pace, or accent.

5. A method as recited in claim 4, wherein the voice of the voice characteristic includes at least a male or female voice.

6. A non-transitory computer readable medium including at least computer program code for facilitating communication amongst users of mobile electronic devices having displays and configured to support wireless communication, including voice and text communications, the computer readable medium comprising:

computer program code for receiving, at a recipient mobile electronic device, an incoming voice call for a recipient user, the incoming voice call being initiated by a sending user using a sender mobile electronic device;

computer program code for displaying, on a display of the recipient mobile electronic device, at least an indication of the incoming voice call;

computer program code for receiving, at the recipient mobile electronic device, a recipient user input in response to the displaying of the indication of the incoming voice call;

computer program code for displaying, in response to the recipient user input, at least predetermined text on the display of the recipient mobile electronic device;

computer program code for answering, in response to the recipient user input, the incoming voice call via a voice channel between the recipient mobile electronic device and the sender mobile electronic device without accepting voice input from the recipient user;

computer program code for obtaining a predetermined audio message having the same message content as the predetermined text message;

computer program code for causing, after the answering of the incoming voice call, the predetermined audio message to be provided from the recipient mobile electronic device to the sender mobile electronic device in an audio manner over the voice channel so that the sending user is able to receive the predetermined audio message, the predetermined audio message being provided over the voice channel to the sender mobile electronic device having the same message content as the predetermined text message that is displayed by the computer program code for displaying of the predetermined text message on the display of the recipient mobile electronic device;

computer program code for causing, after the answering of the incoming voice call, at least a reply message to be provided from the recipient mobile electronic device to the sender mobile electronic device upon determining that the sending user is deemed an undesired caller, the sending user being able to receive the reply message via the sender mobile electronic device;

computer program code for configuring a voice characteristic to be used by the recipient mobile electronic device, the voice characteristic being used for predetermined audio messages by the recipient mobile electronic device; and computer program code for enabling the user of the recipient mobile electronic device to change the voice characteristic being used for predetermined audio messages by the recipient mobile electronic device, wherein the predetermined audio message being provided over the voice channel to the sender mobile electronic device presents the predetermined audio message using the voice characteristic used by the recipient mobile electronic device.

7. A computer readable medium as recited in claim 6, wherein the computer readable medium comprises:

computer program code for closing the incoming voice call after the predetermined audio message has been provided to the sender mobile electronic device.

8. A computer readable medium as recited in claim 6, wherein the computer readable medium comprises:

computer program code for permitting the recipient user to interact with the recipient mobile electronic device to decline the incoming voice call from the sending user.

9. A computer readable medium as recited in claim 6, wherein the computer readable medium comprises:

computer program code for determining whether the recipient user interacts with the recipient mobile electronic device to decline the incoming voice call from the sending user; and computer program code for closing the incoming voice call that has been answered after the predetermined audio message has been provided to the sender mobile electronic device, provided that it has been determined that the recipient user has declined the incoming voice call from the sending user.

10. A computer readable medium as recited in claim 6, wherein the sender mobile electronic device is a mobile phone, and the recipient mobile electronic device is a mobile phone.

11. A computer readable medium as recited in claim 6, wherein the voice characteristic is based on at least one of a voice, tone, pace, or accent.

12. A computer readable medium as recited in claim 11, wherein the voice of the voice characteristic includes at least a male or female voice.

13. A computer readable medium as recited in claim 6, wherein the computer readable medium comprises:

computer program code for receiving, via the voice channel, an incoming audio message from the sender mobile electronic device;

computer program code for converting the incoming audio message into an incoming text message; and computer program code for presenting the incoming text message on the display of the recipient mobile electronic device.

14. A computer readable medium as recited in claim 13, wherein the recipient mobile electronic device is a mobile phone.

15. A computer readable medium as recited in claim 6, wherein the reply message instructing the sending user to not call again or to remove the recipient user's information.

16. A method for facilitating communication amongst users of mobile electronic devices having displays and configured to support wireless communication, including voice and text communications, the method comprising:

- receiving, at a recipient mobile electronic device, an incoming voice call for a recipient user, the incoming voice call being initiated by a sending user using a sender mobile electronic device;
- displaying, on a display of the recipient mobile electronic device, at least an indication of the incoming voice call;
- receiving, at the recipient mobile electronic device, a recipient user input in response to the displaying of the indication of the incoming voice call;
- displaying, after the recipient user input is received, at least a predetermined text message on the display of the recipient mobile electronic device;
- answering, after the recipient user input is received, the incoming voice call to establish a voice channel between the recipient mobile electronic device and the sender mobile electronic device without the recipient user perceiving that the incoming voice call has been answered;
- obtaining, at the recipient mobile electronic device, a predetermined audio message having the same message content as the predetermined text message; and
- causing, after the answering of the incoming voice call, the predetermined audio message to be provided from the recipient mobile electronic device to the sender mobile electronic device in an audio manner over the voice channel so that the sending user is able to receive the predetermined audio message, the predetermined audio message being provided over the voice channel to the sender mobile electronic device having the same message content as the predetermined text message that is displayed by the displaying of the predetermined text message on the display of the recipient mobile electronic device;
- configuring a voice characteristic for predetermined audio messages to be used by the recipient mobile electronic device for voice outputs; and
- enabling the user of the recipient mobile electronic device to change the voice characteristic used by the recipient mobile electronic device for voice outputs,
- wherein the predetermined audio message being provided over the voice channel to the sender mobile electronic device presents the predetermined audio message using the voice characteristic used by the recipient mobile electronic device for voice outputs.

17. A method as recited in claim 16, wherein the voice characteristic is based on at least one of a voice, tone, pace, or accent.

18. A method as recited in claim 17, wherein the voice of the voice characteristic includes at least a male or female voice.

19. A method as recited in claim 16, wherein the method comprises:
- determining whether the recipient user interacts with the recipient mobile electronic device to decline the incoming voice call from the sending user.

20. A method as recited in claim 16, wherein the recipient mobile electronic device is a mobile phone.

\* \* \* \* \*